UNITED STATES PATENT OFFICE.

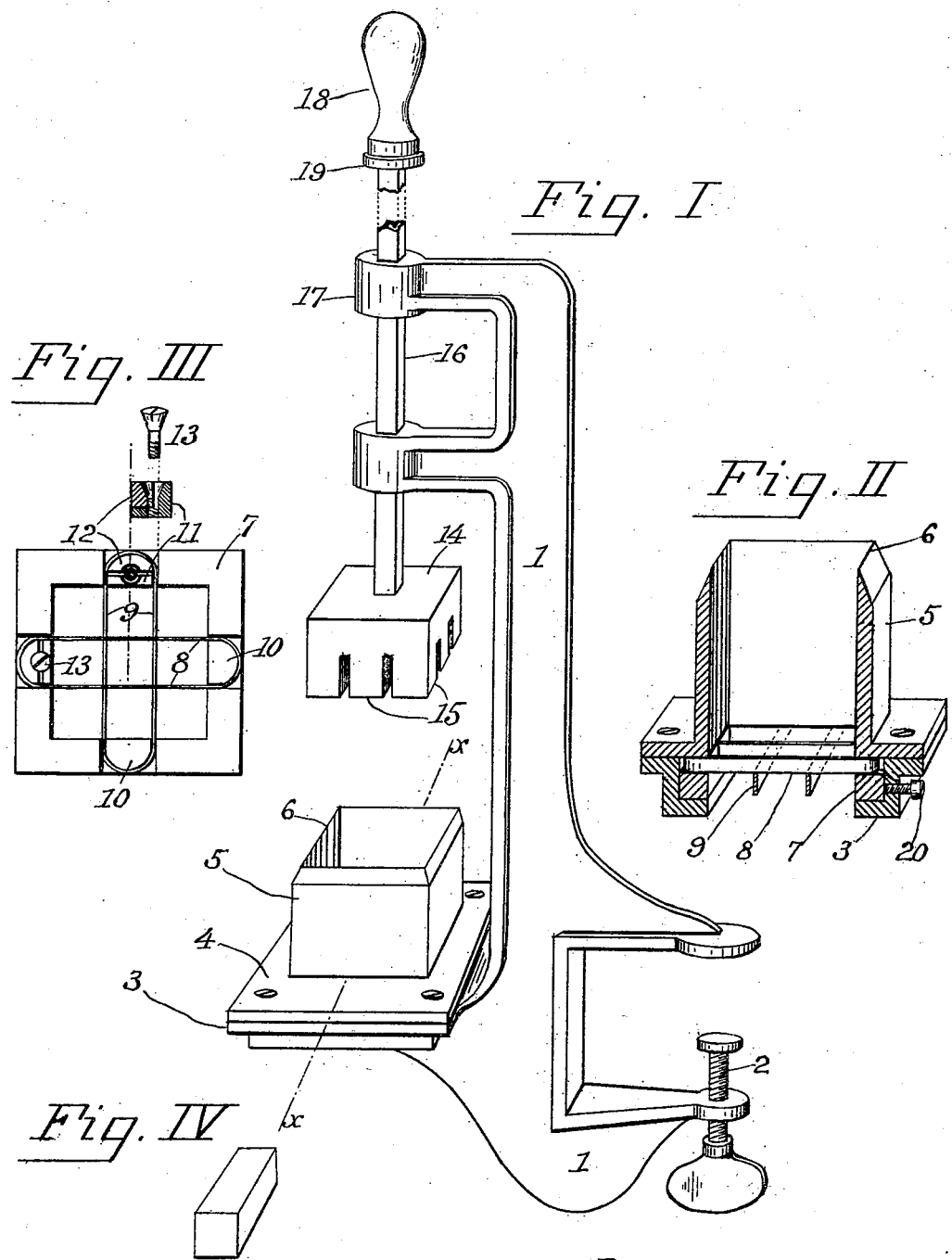

HORACE BOOS, OF CINCINNATI, OHIO.

VEGETABLE-CUTTER.

SPECIFICATION forming part of Letters Patent No. 690,512, dated January 7, 1902.

Application filed February 18, 1901. Serial No. 47,751. (No model.)

*To all whom it may concern:*

Be it known that I, HORACE BOOS, a citizen of the United States, residing at Cincinnati, in the State of Ohio, have invented a certain new and useful Machine for Slicing Vegetables, of which the following is a specification.

My invention relates to the culinary art and to machines for preparing vegetables for cooking; and it consists, primarily, in a novel slicing-knife and hopper and plunger coacting therewith to slice potatoes and such articles into blocks or slabs to facilitate cooking uniformly, and in certain other combinations of mechanism and certain details of construction hereinafter set forth.

In the accompanying drawings, Figure I is a perspective view of the machine. Fig. II is an enlarged perspective and sectional view of the cutting box and knives along line X X of Fig. I. Fig. III is a plan view of the knives and knife-frame, with a section of part of the latter. Fig. IV illustrates the form of block cut out by this particular arrangement of the knives.

In cooking such vegetables as potatoes—as in the form called "French fried," for example—it is found necessary to have all the pieces of uniform thickness and shape in order that the cooking may be uniform. The machine illustrated is designed to cut potatoes in the form of Fig. IV.

The upright standard 1 has clamping-jaws and a screw 2 for attachment to a table. It has a forward platform extension 3, which has an opening in its middle and countersunk shelf-flanges, as shown at Fig. II, (3,) which support the knife-frame 7, which is slid into place from the front. The top of platform extension 3 supports the base of a shaping cutter or hopper 5, which has sharpened knife-edges all around its top 6. The upper part of the standard 1 has horizontal arms carrying bearing-heads 17, and through these heads, in angular holes, slides the plunger-rod 16, which may be of square cross-section to prevent turning and insure an accurate fit of the plunger 14 in the cutting-box 5 and the knives beneath it. The rod 16 has a handle 18 tightly screwed on and is supplied with a buffer, such as the rubber washer 19, to arrest the downward motion of the plunger. The plunger 14 is of square shape to fit loosely in the cutting-box 5, and it is split or subdivided for about half its length into a series (nine in this instance) of subsidiary plungers 15 for pushing the material clear through the knives below. The plunger-bar 16 is of such a length that the plungers 15 descend entirely through the knives, but of course stop short of contact with them. A retractile spring may be used to withdraw the plunger.

The knife-frame, Fig. III, is in this instance a heavy square ring of square cross-section. The knife-blades 8 9 may be made of steel watch-spring and are continuous bands looping around hubs or studs 10 and 11 at either end. There are two blades in each direction, disposed at right angles to each other, and they divide the space into nine equal square spaces a little larger than the square subsidiary plungers 15, so that the latter pass clear. The set of blades 9 lie below the set 8, so that the cutting in one direction is entirely finished before the material arrives at the other set. At one side of the frame 7 the stud 10 is fixed, while at the other side the stud is divided into a fixed portion 11 and a loose sliding block 12, which two pieces are complementary and have a screw-hole to receive the screw 13. This latter has a tapering shoulder, so that as it enters it wedges the block 12 away from the stud 11, and thus tightens the band-knife 9 10, as will be plain from Fig. III. The knife-blades are held snugly in the sawed slots defining the studs 10 11, and of course the pair supporting the knives 9 are deeper than the others, in order to allow for the superposition of the knives 8, as aforesaid.

The operation is evident. When a potato, for example, is placed on top of the cutting-box 5 and the plunger depressed on it, the edges 6 cut off all the outside of the potato, which is irregular in shape, and so the block of material brought upon the knives is regular in form. This is very important, as any irregular pieces mixed with the properly-shaped blocks have to be afterward picked out or else the cooking is irregular, and, moreover, this squaring off of the block before slicing avoids any crushing of the material, which is objectionable. The shape of the knife-blades in section being uniform in thickness also avoids the same difficulty in the cutting, while the arrangement of one set of blades entirely below the other set avoids clogging of the same, as happens in all the machines now in use. The frame 7, carrying the blades, is held in its slot under the platform and box 5 by the set-screw 20. It may easily be slid out and the knife-blades mended or replaced by simply loosening the screw 13 and lifting them out of their seats in the slots. The knife-blades should be of a stiff material, so as not to give vertically.

It is evident that I may have any number of knife-blades by sawing extra slots in the frame 7 and that I might use other forms of space between or use another method of tightening the knives—as, for example, a continuous piece of watch-spring may be used, passing back and forth across the space and tightened by a screw at one end only, or the band-knife shown might be tightened by driving a wedge between the sections 11 and 12, or the knives might evidently be soldered in slots. I do not confine myself to the specific construction shown; but,

Having thus described my invention, what I claim, and desire to secure by Letters Patent, is the following:

1. A slicing-machine comprising an open-ended box having its upper periphery beveled to a cutting edge, a set of knives beneath and a plunger formed to fit in the box and push material through the knives in cutting.

2. In a vegetable-slicing machine, in combination with a set of knives and a subdivided plunger coöperating therewith, a hopper having a cutting edge to shape the vegetable as it descends upon the knives.

3. A slicing-machine comprising a shaping-box having a cutting edge on top combined with a removable set of knives in lines crossing at right angles, and a subdivided plunger coöperating therewith.

4. In a slicing-machine the combination of a double set of knives held in a rigid removable frame and being themselves removable in single pairs therefrom, one set being placed at an angle to, and being superposed upon, the other set, a subdivided plunger coöperating with said knives to push the material clear through both sets, and a shaping-box with a cutting edge coöperating with said plunger to shape the material as it is advanced against the knives.

5. A cutter comprising a rigid frame and a band-knife carried in slots in said frame, one of the loops of the band being supported on a split stud composed of a fixed part and a complementary sliding block adjustably held in place partly by a screw with a tapering head, so that by tightening the screw the sliding block may move to tighten the band-knife.

6. The combination with a rigid removable frame carrying several independent sets of knives of rectangular cross-section, the sets being placed in different planes, of a plunger to push material clear through all the knives and a shaping-box with a cutting edge to shape the material as it is advanced by the plunger against the knives.

In witness whereof I have hereunto subscribed my name in the presence of two witnesses.

HORACE BOOS.

Witnesses:
CHAS. H. URBAN,
O. J. BOOS.